United States Patent

Kato

Patent Number: 6,043,905
Date of Patent: Mar. 28, 2000

[54] IMAGE PROCESSING APPARATUS

[75] Inventor: Tokunori Kato, Aichi-ken, Japan

[73] Assignee: Brother Kogyo Kabushiki Kaisha, Aichi-ken, Japan

[21] Appl. No.: 08/734,726

[22] Filed: Oct. 21, 1996

Related U.S. Application Data

[63] Continuation of application No. 08/510,481, Aug. 2, 1995, which is a continuation of application No. 08/252,090, Jun. 1, 1994, abandoned.

[30] Foreign Application Priority Data

Jun. 2, 1993 [JP] Japan .................................. 5-157955

[51] Int. Cl.$^7$ ............................................ H04N 1/40
[52] U.S. Cl. .......................... 358/448; 358/451; 382/298; 382/299
[58] Field of Search .................... 358/448, 451, 358/496, 498, 400, 401; 382/293, 298, 299

[56] References Cited

U.S. PATENT DOCUMENTS

| | | | |
|---|---|---|---|
| 4,163,605 | 8/1979 | Yamada | 358/451 |
| 4,644,409 | 2/1987 | Fuchs | 358/474 |
| 4,672,464 | 6/1987 | Shida | 358/451 |
| 4,679,096 | 7/1987 | Nagashima | 358/451 |
| 4,687,944 | 8/1987 | Mitsuka et al. | 358/451 |
| 4,916,747 | 4/1990 | Arimoto | 358/451 |

*Primary Examiner*—Thomas D. Lee
*Attorney, Agent, or Firm*—Pitney, Hardin, Kipp and Szuch LLP

[57] ABSTRACT

An image processing apparatus includes a scanner for reading an image, a controller for converting the scanned image to a image having a predetermined resolution, a recorder for recording the image having a predetermined resolution, on a recording sheet and a motor for feeding the recording sheet a predetermined pitch. The controller skips some of the image data converted to the predetermined resolution according to a size that the image is to be reduced to, such that no more than one line of image data is skipped successively. When successive lines of image data are recorded the controller controls the motor to feed the recording sheet at the predetermined pitch, separated by a first interval of time. When one line of image data is skipped the controller controls the motor to feed the recording sheet at the predetermined pitch, separated by a second interval of time which is twice as long as the first interval of time.

16 Claims, 8 Drawing Sheets

| | |
|---|---|
| READ A LINE IMAGE DATA | (00100100) |
| READ B LINE IMAGE DATA | (01111110) |
| READ C LINE IMAGE DATA | (01011010) |
| READ D LINE IMAGE DATA | (11111111) |
| READ E LINE IMAGE DATA | (01000010) |

| | |
|---|---|
| A1 LINE IMAGE DATA | (00100100) |
| A2 LINE IMAGE DATA | (00100100) |
| B1 LINE IMAGE DATA | (01111110) |
| B2 LINE IMAGE DATA | (01111110) |
| C1 LINE IMAGE DATA | (01011010) |
| C2 LINE IMAGE DATA | (01011010) |
| D1 LINE IMAGE DATA | (11111111) |
| D2 LINE IMAGE DATA | (11111111) |
| E1 LINE IMAGE DATA | (01000010) |
| E2 LINE IMAGE DATA | (01000010) |

IMAGE PROCESSING APPARATUS

This application is a continuation of application Ser. No. 08/510,481, filed Aug. 2, 1995, which is a continuation of application Ser. No. 08/252,090 filed on Jun. 1, 1994, now abandoned.

BACKGROUND OF THE INVENTION

The present invention relates to an image processing apparatus such as a facsimile apparatus, and more particularly to an image processing apparatus with a control system for controlling a feed motor which feeds a recording sheet when image data that have been received or read are to be compressed.

As facsimile apparatus find widespread use, they are equipped with an increasing number of functions. For example, some facsimile apparatuses can transmit and receive image data of documents in fine and superfine high resolution modes, as well as in a low resolution standard mode. Further, these apparatuses can provide a copying function and a size reduction function.

In the superfine mode, an image reader of the facsimile apparatus reads image data at a resolution corresponding to a superfine line (400 dpi). In the fine mode, the image reader reads image data at a resolution corresponding to two superfine lines (i.e., 200 dpi).

When image data read by the image reader and stored in a memory are to be copied on a recording sheet at a preset size reduction percentage, some of the image data is eliminated in an auxiliary scanning direction and then the remaining data is recorded on the recording sheet.

For example, image data composed of first line data (A line image data), second line data (B line image data), third line data (C line image data), fourth line data (D line image data), fifth line data (E line image data), etc., which is read in a fine mode, is to be reduced to 60% of its original size. The B and D line image data are skipped when processing the line data read in the fine mode. The remaining line data are converted to superfine data (i.e., A1, A2, C1, C2, E1, E2, etc.,) and successively recorded by an image recorder on a recording sheet. Thus the data processing is done on the fine mode data.

The recording sheet is fed in the auxiliary scanning direction by a feed motor that comprises a stepping motor. The feed motor feeds the recording sheet a superfine pitch of about 65 μm each time one set of line image data is recorded on the recording sheet by the image recorder. Thus the feed motor is energized for a predetermined time "t" when each line image data is recorded on the recording sheet, and remains de-energized for a predetermined time "3t" (i.e., three times the period t), when line data (i.e., two successive lines) are being skipped.

Consequently, the feed motor is energized at different intervals of time, with the recording sheet being fed intermittently. Due to the moment of inertia and the load imposed on the feed motor, the feed motor is apt to step out of control. When the feed motor steps out of control, the recording sheet is fed an inaccurate distance, resulting in a reduction in the quality of the image copied onto the recording sheet.

Further, the skipping of two successive superfine data lines results in an uneven representation of the original image being reduced, since some data is completely omitted, and thus a poor quality image is recorded on the recording sheet.

SUMMARY OF THE INVENTION

It is therefore an object of the present invention to provide an image processing apparatus which, when received image data or image data to be copied are to be reduced in size, produces a high quality reduced image and which results in the motor feeding the recording sheet smoothly.

According to the present invention, there is provided an image processing apparatus comprising:

receiving means for receiving lines of image data transmitted from an external source;

control means for converting each of said lines of image data to high-density image data having a predetermined resolution;

recording means for successively recording lines of said high density image data on a recording sheet; and setting means for setting a size that said image is to be reduced to and recorded on said recording sheet, wherein said control means controls said recording means to skip selected lines of said high-density image data according to said size of said reduced image, wherein at least one high density image data of each line of image data is recorded on said recording sheet.

According to the present invention, there is also provided an image processing apparatus comprising:

scanning means for scanning an image, said scanning means outputting lines of image data;

control means for converting each of said lines of line image data to high-density line image data having a predetermined resolution;

recording means for successively recording lines of said high density line image data on a recording sheet;

feeding means for feeding said recording sheet a predetermined pitch along a predetermined direction after one of said lines of image data is recorded on said recording sheet by said recording means, wherein said predetermined pitch corresponds to said predetermined resolution; and setting means for setting a size that said image is to be reduced to and recorded on said recording sheet, wherein said control means sends a drive pulse to said feeding means each time said recording means records said line of high-density line image data, wherein when consecutive lines of said high-density line image data are recorded, said drive pulses are sent at a first predetermined time interval, and wherein when said line of high density image data is skipped, said drive pulses are sent at a second predetermined time interval, said second predetermined time interval twice as long as said first predetermined time interval.

DESCRIPTION OF THE EMBODIMENT

The principles of the present invention are particularly useful when embodied in a facsimile apparatus which is capable of recording received image data onto a recording sheet and which also has a copying function.

Figure 1:
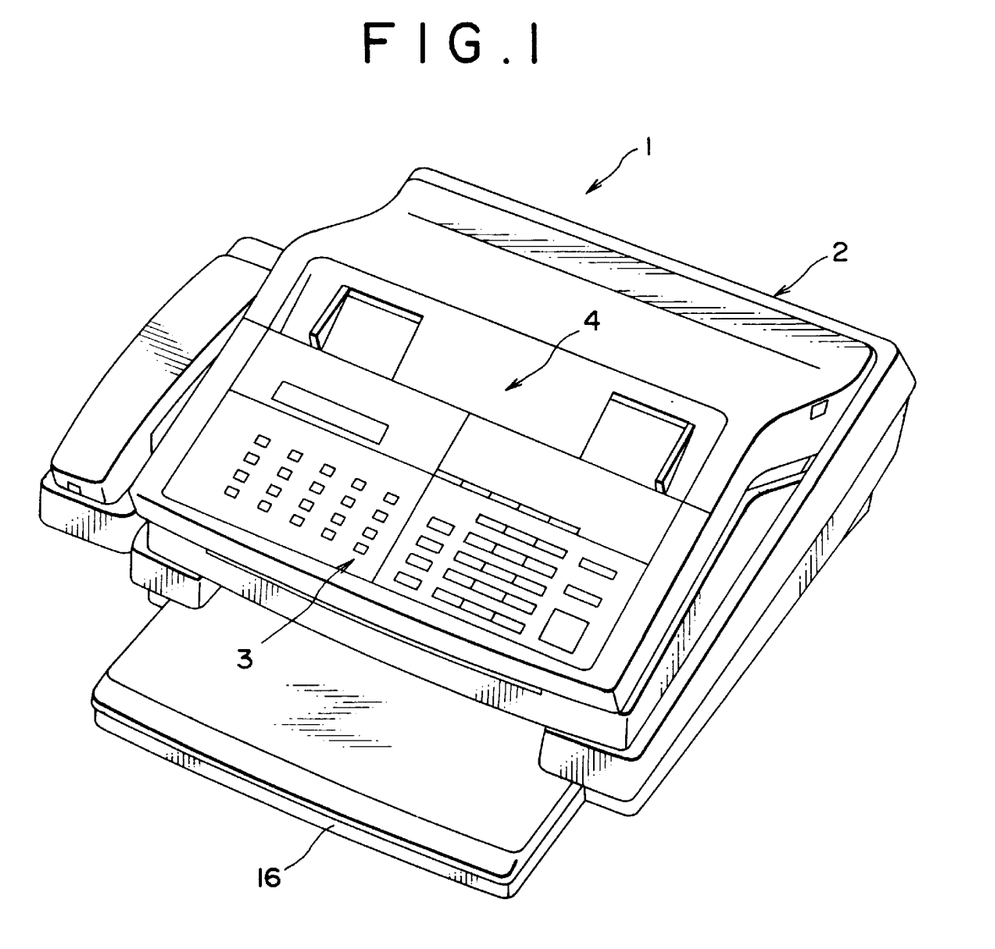
FIG. 1 is a perspective view of a facsimile apparatus embodying the present invention.
Figure 2:
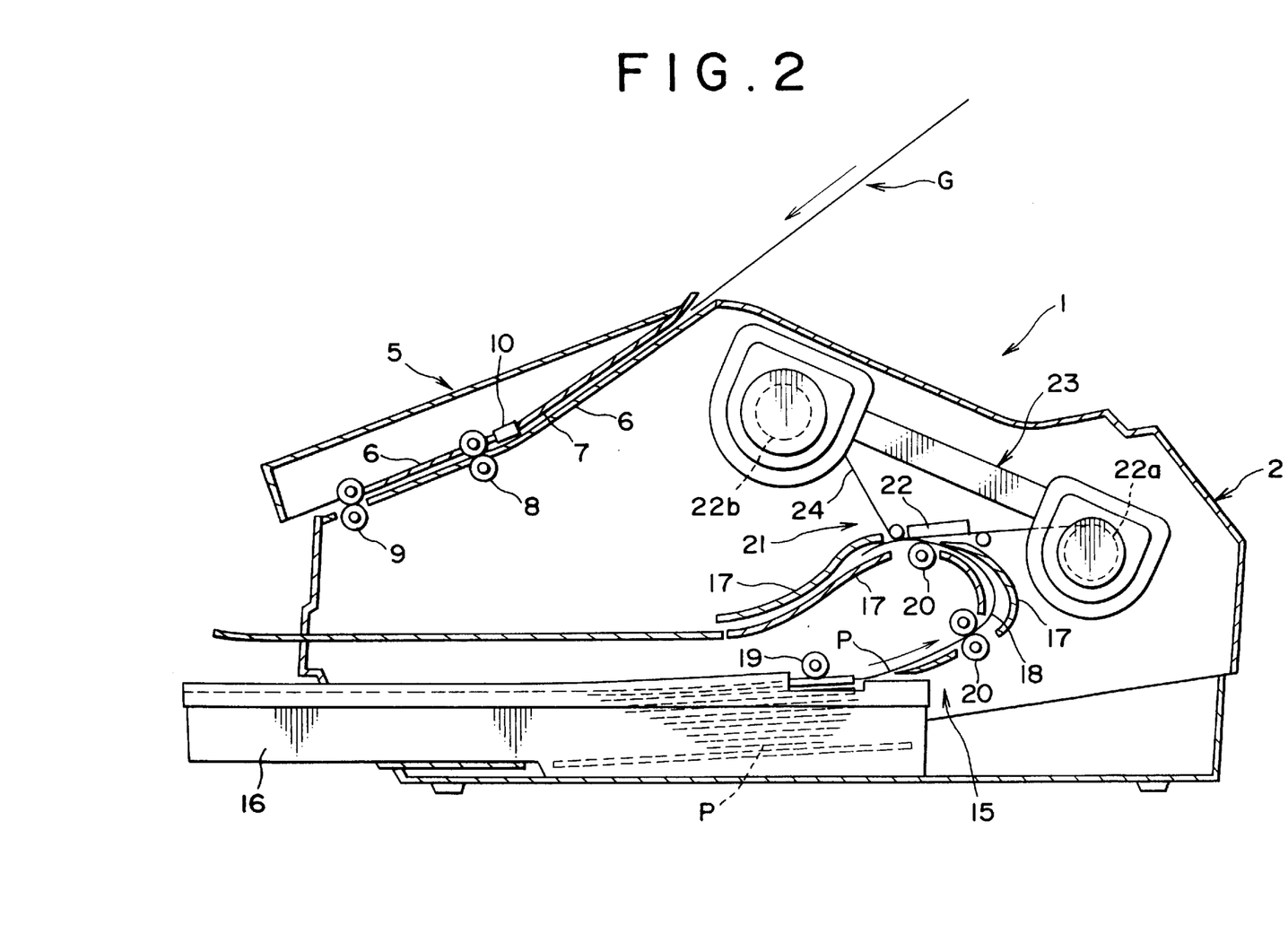
FIG. 2 is a schematic vertical cross-sectional view showing an internal structure of the facsimile apparatus shown in FIG. 1.

The facsimile apparatus, generally designated by the reference numeral 1 in FIGS. 1 and 2, comprises a housing 2 having a control panel 3 on an upper front region thereof. The control panel 3 has a plurality of function keys including a transmission key, a copy key, a size reduction percentage setting key, a ten key pad, and other keys for transmitting and copying document image data. The facsimile apparatus 1 has a document holder 4 disposed immediately behind the control panel 3 for placing one or more documents G, which may comprise separate sheets of different sizes such as A4 and B5 sizes.

The facsimile apparatus 1 also has an image reader 5 disposed in the housing 2 for reading an image from a document G which is set on the document holder 4. The image reader 5 will now be described below with reference to FIG. 2.

The image reader 5 has a first sheet passage 7 defined between guide plates 6 in the housing 2 immediately beneath the control panel 3 for guiding a document G set on the document holder 4 out of the facsimile apparatus 1. The image reader 5 also has a pair of sheet feed rollers 8 disposed in a central region of the first sheet passage 7 for feeding a document G in and along the first sheet passage 7, and a pair of sheet discharge rollers 9 disposed in a downstream end of the first sheet passage 7 for discharging a document G out of the first sheet passage 7. The sheet feed rollers 8 and the sheet discharge rollers 9 can be rotated synchronously by a document feed motor 35 (see FIG. 3) in a direction to feed and discharge a document G.

The image reader 5 includes a reading sensor 10 for reading an image of a document G, as it is fed by the sheet feed rollers 8, and a light-emitting diode (LED) 11 (see FIG. 3) for emitting light. The reading sensor 10 and the LED 11 (not shown) are disposed immediately above the sheet feed rollers 8 and face into the first sheet passage 7. The reading sensor 10 comprises a charge-coupled device (CCD) line image sensor for storing electric charges corresponding to light emitted by the LED 11 and reflected by the document G in the first sheet passage 7, thereby reading one line of image data at a time, from the document G.

The facsimile apparatus 1 further has an image recorder 21 for recording, onto a recording sheet P, image data which has been received from an external source or image data of a document G which has been read by the image reader 5; and a sheet feeder 15 for feeding a recording sheet P. The image recorder 21 and the sheet feeder 15 will be described below with reference to FIG. 2.

The housing 2 houses a removable sheet cassette 16 (see also FIG. 1) in a lower end thereof, the sheet cassette 16 storing a plurality of recording sheets P which may comprise separate sheets of different sizes such as A4 and B5 sizes. A second sheet passage 18 which is defined between guide walls 17, 17 extends in a substantially U shape from a rear end of the sheet cassette 16 which is located within the housing 2. A sheet supply roller 19 is disposed at a starting or upstream end of the second sheet passage 18 where it meets the sheet cassette 16. A plurality of sheet feed rollers 20 are disposed in an intermediate region of the second sheet passage 18, the sheet feed rollers 20 contacting the sheet P.

The image recorder 21 comprises a thermal head 22 which faces the recording sheet P, and is located near one of the sheet feed rollers 20. The thermal head 22 includes a linear array of heating elements, (i.e., 1728 heating elements), extending a predetermined distance across the width of the second sheet passage 18, (i.e., along a main scanning direction). The sheet supply rollers 19 and the sheet feed rollers 20 can be rotated synchronously by a sheet feed motor 37 (see FIG. 3) in a direction to feed the recording sheet P in an auxiliary scanning direction along the second sheet passage 18. The image recorder 21 also has a ribbon cassette 23 housed in the housing 2 above the second sheet passage 18. The ribbon cassette 33 houses an ink ribbon 24 which is as wide as the thermal head 22. The ink ribbon 24 is wound on a ribbon supply spool 22a rotatably supported in the ribbon cassette 23, the ink ribbon 24 being supplied across the thermal head 22 and wound by a ribbon take-up spool 22b which is also rotatably supported in the ribbon cassette 23.

When the image recorder 21 starts to operate to record a desired image, an uppermost recording sheet P stored in the sheet cassette 16 is fed into the second sheet passage 18 by the sheet supply roller 19, and then fed into and along the second sheet passage 18 at a predetermined speed by the sheet feed rollers 20. While the recording sheet P is being fed along the second sheet passage 18, a desired image is recorded on the recording sheet P by the ink ribbon 24 which is selectively heated by the thermal head 22. The recording sheet P with the image recorded thereon is then discharged through the second sheet passage 18 out of the facsimile apparatus 1.

Figure 3:
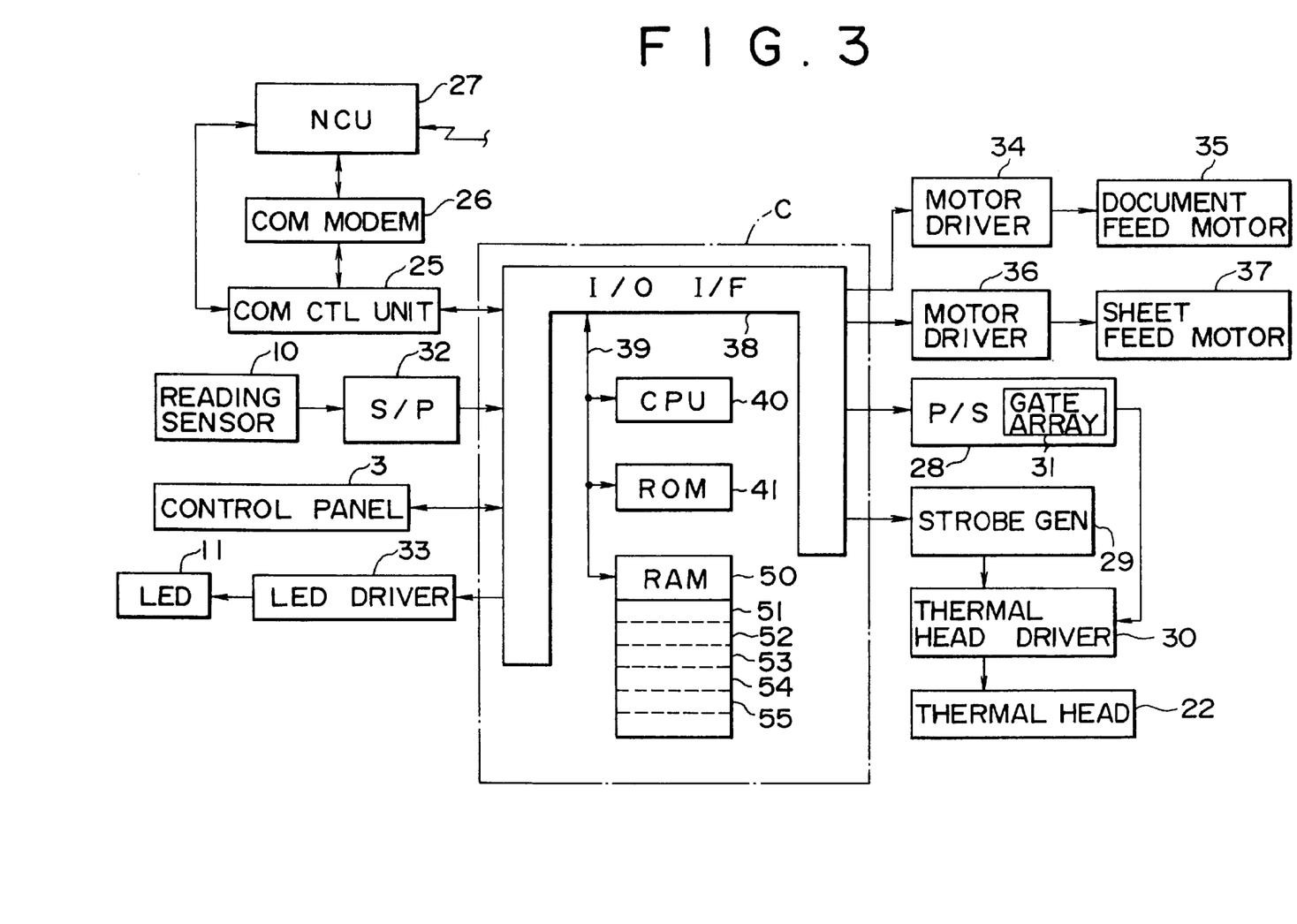
FIG. 3 is a block diagram of a control system of the facsimile apparatus shown in FIG. 1.

The facsimile apparatus 1 has a control system as shown in FIG. 3.

As shown in FIG. 3, the control system has a communication control unit 25 connected to an input/output interface 38 of a controller C, a communication modem 26, and a network control unit (NCU) 27. The communication control unit 25 controls the facsimile apparatus 1 when transferring control signals and image data received from the input/output interface 38 to the communication modem 26, or when transferring control signals and image data received from the communication modem 26 to the input/output interface 38. The communication modem 26 modulates image data to be transmitted to produce a transmission signal, and demodulates a received transmission signal to recover image data. The network control unit 27 automatically transmits a signal to an external destination, and automatically receives a signal from an external source.

The thermal head 22 is energizable by a thermal head driver 30 to which a strobe signal generator 29 and a parallel-to-serial (P/S) converter 28 are connected. The P/S converter 28, which includes a gate array 31, converts parallel image data, outputted from the input/output interface 38, to serial image data, and supplies the serial image data to the thermal head driver 30. In response to strobe signals received from the strobe signal generator 29, the thermal head driver 30 outputs a drive signal to the thermal head 22. Specifically, the thermal head driver 30 receives a first strobe signal SS1 and a second strobe signal SS2 from the strobe signal generator 29. The heating elements of the left-hand half of the array of the thermal head 22 are energized in response to the first strobe signal SS1, while the heating elements of the right-hand half of the array of the thermal head 22 are energized in response to the second strobe signal SS2.

A serial-to-parallel (S/P) converter 32 for converting serial image data outputted from the reading sensor 10 to parallel image data, an LED driver 33 for energizing the light-emitting diode 11, a motor driver 34 for energizing the document feed motor 35, and a motor driver 36 for energizing the sheet feed motor 37 are connected to the input/output interface 38. The control panel 3, the P/S converter 28, and the strobe signal generator 29 are also connected to the input/output interface 38. Each of the document feed motor 35 and the sheet feed motor 37 typically comprises a stepping motor.

The controller C includes a central processing unit (CPU) 40, a read-only memory (ROM) 41, and a random-access memory (RAM) 50 which are connected to the input/output interface 38 through a data bus 39.

The ROM 41 stores various control programs such as an encoding control program for generating a transmission signal representing compressed (encoded) image data of a document G, a decoding control program for recovering (decoding) image data from an encoded transmission signal, a control program for reducing and copying image data, and other facsimile communication control programs.

The RAM 50 includes a received data memory 51, having a predetermined memory capacity (e.g. 256 kilobytes), for successively storing received transmission signals, (i.e., encoded image data). The RAM 50 also includes a decoded data memory 52 for storing image data decoded from transmission signals received from the received data memory 51 and image data read by the reading sensor 10 when an image is to be copied. The RAM 50 also includes a first recording data memory 53 for storing high-density image data having a high resolution (in the superfine mode) which is converted from image data stored in the decoded data memory 52. The RAM 50 also includes a second recording data memory 54 for storing reduced image data after some of the high-density image data stored in the first recording data memory 53 has been eliminated (explained later), according to the amount of image reduction. The RAM 50 also includes an encoded data memory 55 for storing image data that is encoded for transmission. The RAM 50 further has a work memory for storing data related to the size of the reduced image that is to be recorded on a recording sheet P, and also for storing the values of pointers, and various memories for temporarily storing calculated results from the CPU 40.

The facsimile apparatus 1 can receive and record image data which have been transmitted in a superfine mode, a fine mode, and a standard mode. In the superfine mode, a document G is read at a resolution of 400 dots/inch. In the fine mode, a document G is read at a resolution corresponding to two lines of the superfine mode. In the standard mode, a document G is read at a resolution corresponding to four lines of the superfine mode.

Each line of image data received or read at a resolution of the superfine mode is recorded on a recording sheet P each time the recording sheet P is fed a superfine pitch of about 65 μm. Each line of image data received or read at the resolution of the fine mode is converted to image data corresponding to two superfine lines, and recorded on a recording sheet P each time the recording sheet P is fed by the superfine pitch. Each line of image data received or read at the resolution of the standard mode is converted to image data corresponding to four superfine lines, and recorded on a recording sheet P each time the recording sheet P is fed the superfine pitch.

A routine of a control process, which is executed by the CPU 49 of the controller C, for reducing the size of an image read by the reading sensor 10, and for copying the reduced image on a recording sheet P, will be described below with reference to FIG. 4. At the beginning of the routine, image data which is read by the reading sensor 10 at the resolution of the fine mode is composed of a plurality of line data, which include, as shown in FIG. 5, first line data (A line image data), second line data (B line image data), third line data (C line image data), fourth line data (D line image data), fifth line data (E line image data), etc., which are temporarily stored in the decoded data memory 52. In FIG. 5, a first byte of each of the line data is illustrated by way of example.

Figure 4:
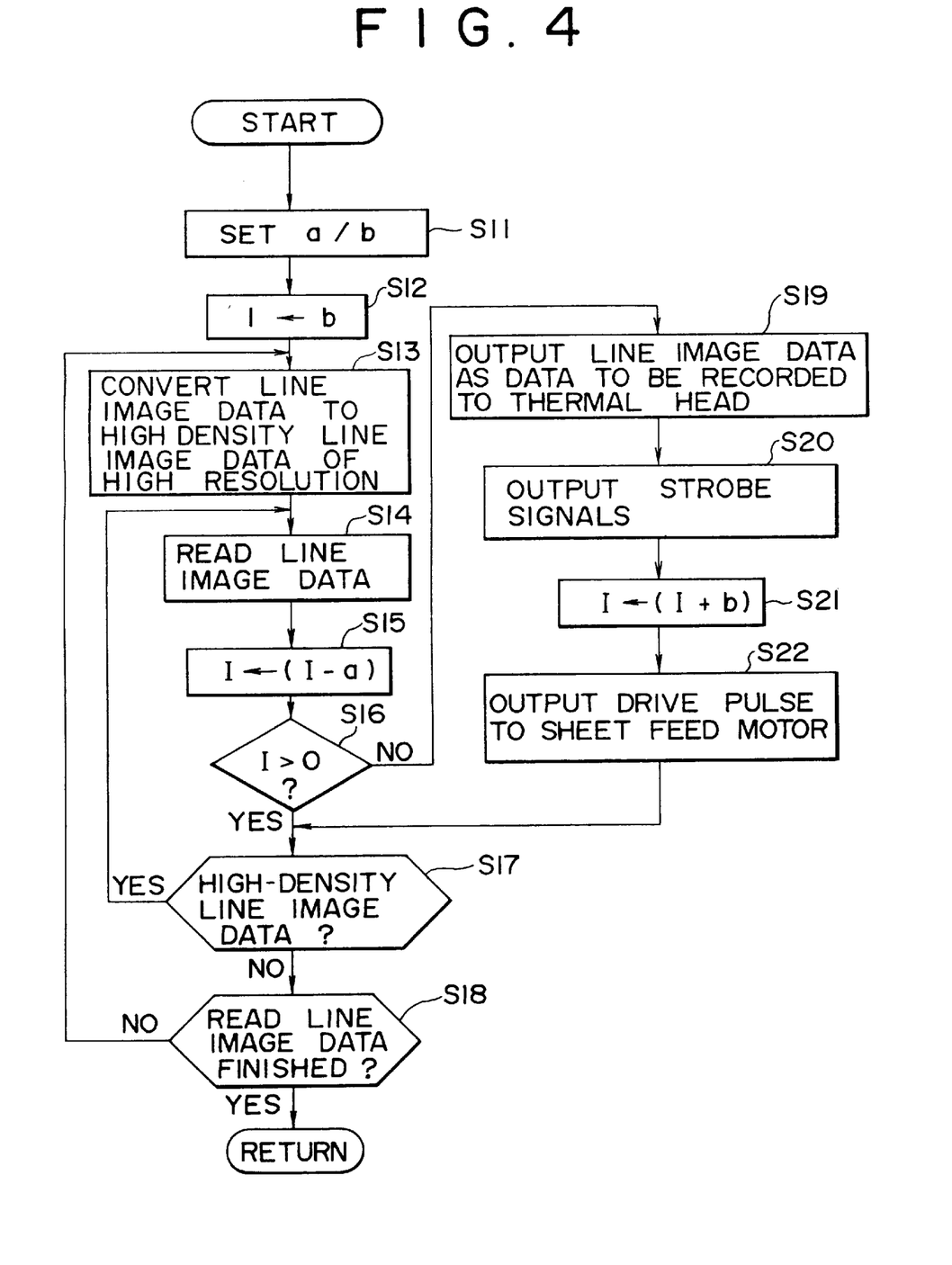
FIG. 4 is a flowchart of a routine of a control process for reducing the size of image data and for recording the image data of the reduced size onto a recording sheet.
Figure 5:
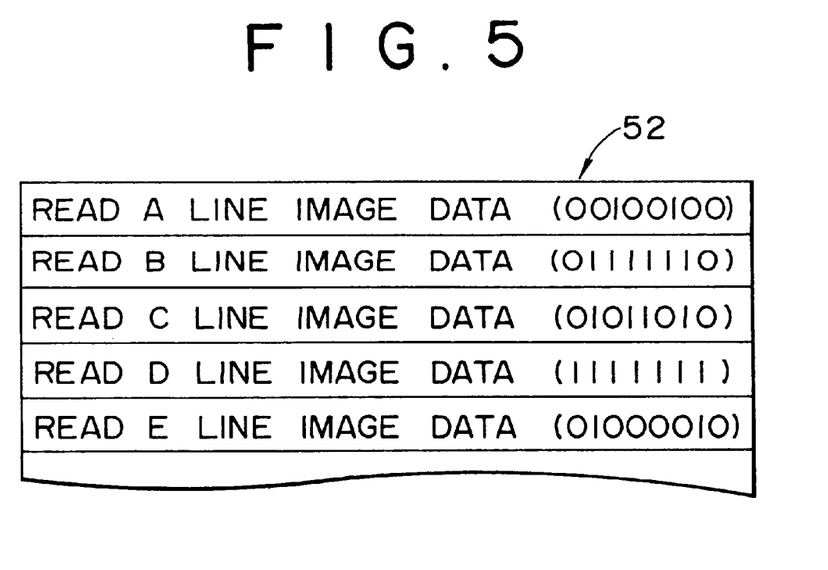
FIG. 5 is a diagram of line image data which are read and then stored in a data memory.
Figure 6:
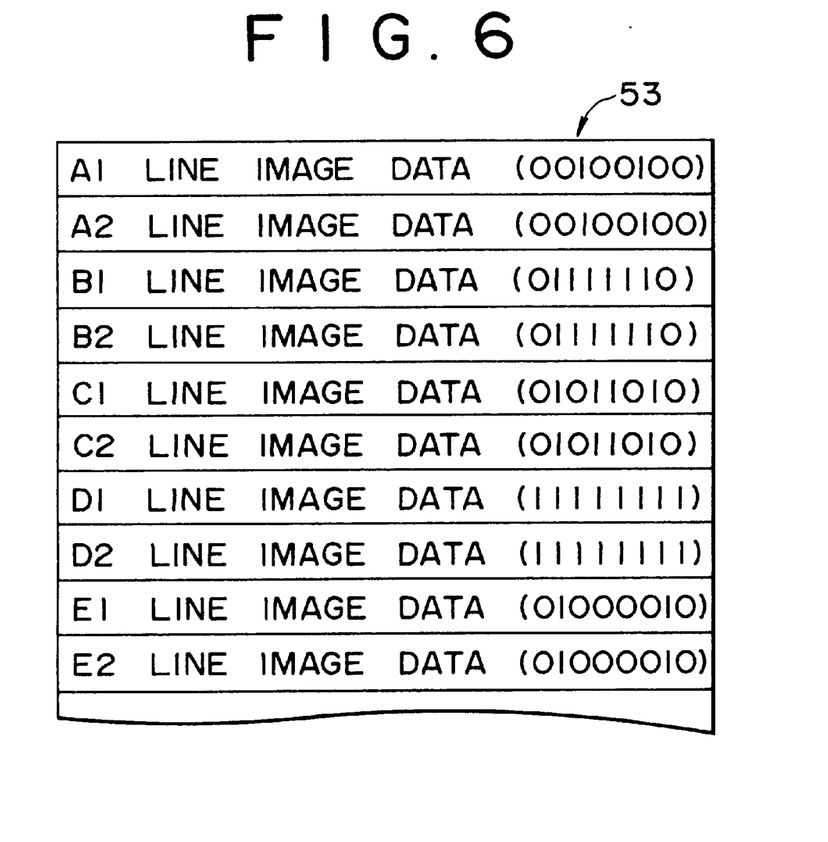
FIG. 6 is a diagram of high-density image data which are stored in a first recording data memory.
Figure 7:
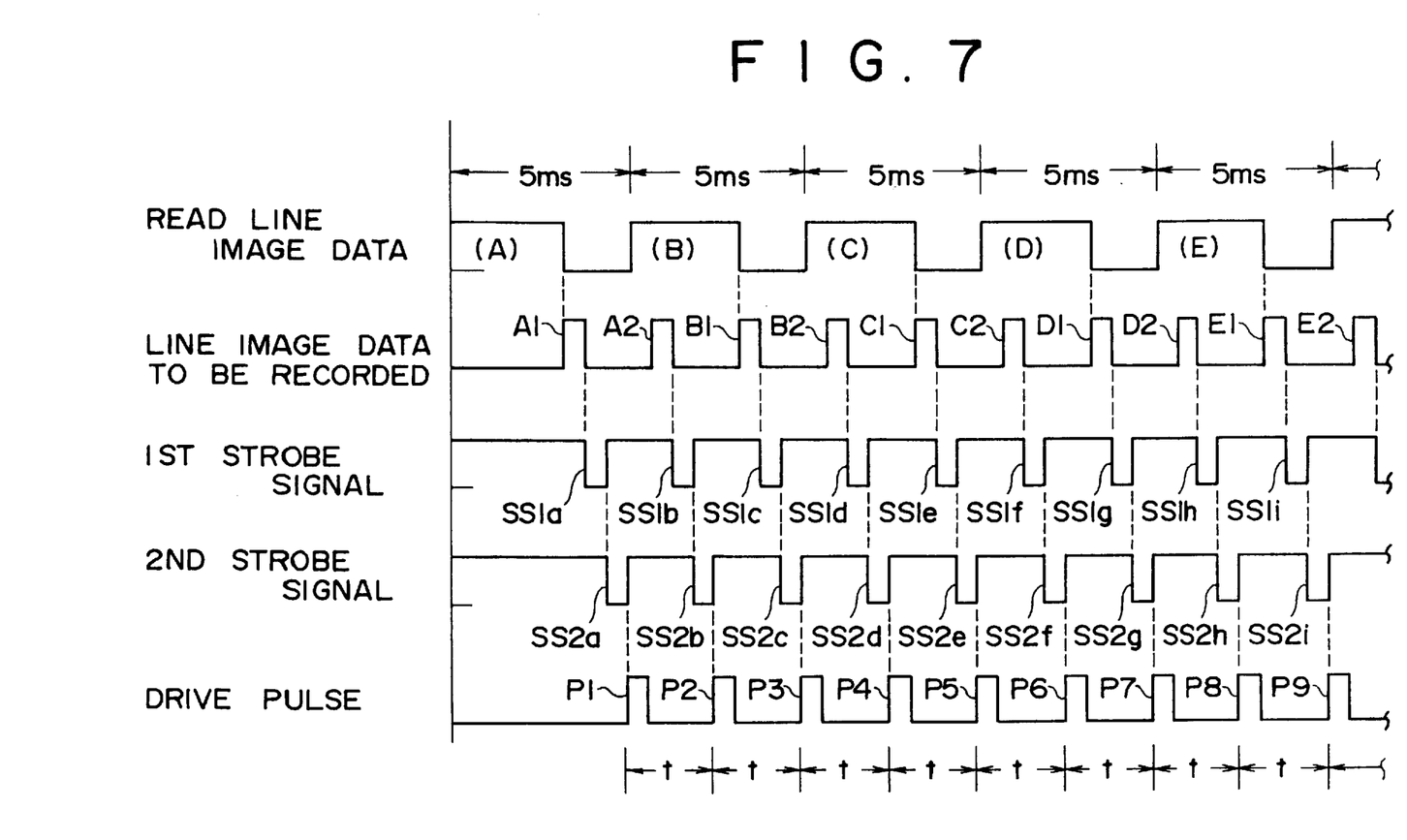
FIG. 7 is a timing chart of various signals produced in the facsimile apparatus when image data is recorded at its original size.

The control process shown in FIG. 4 starts being executed when line data read by the reading sensor 10 are stored in the decoded data memory 52. First, the CPU 40 reads the data related to the size of the reduced image with respect to the original image, (i.e., the size of the reduced image/the size of the original image), which is expressed as a ratio, a/b. Then the variables "a", "b" are set in a step S11. Then, the CPU 40 sets a variable I to the variable "b" in step S12. The CPU 40 converts the first line of data stored in the decoded data memory 52 to line data corresponding to two superfine lines (in the auxiliary scanning direction), thus converting the line data to high-resolution image data which is stored in the first recording data memory 53, in step S13. As shown in FIG. 6, the CPU 40 converts A line image data read from the decoded data memory 52 to high-density line data corresponding to two superfine lines, thus converting the A line image data to A1 line image data and A2 line image data which are then stored in the first recording data memory 53.

Then, the CPU 40 reads the first high-density line data from the first recording data memory 53 in step S14, and sets the variable I to I–a in step S15. If the variable I is greater than "0" in step S16 (Yes), then the high-density line data read from the first recording data memory 53 is to be skipped (not recorded on the recording sheet), and the CPU 40 does not control the strobe signal generator 29 to output strobe signals SS1, SS2 to the thermal head driver 30. Therefore, no image data is recorded on the recording sheet P by the thermal head 22. If there is converted high-density line data still stored in the first recording data memory 53 in a step S17 (Yes), then control returns to the step S14, and the CPU 40 repeats the steps S14 through S17.

When the CPU 40 has read all the converted high-density line data from the first recording data memory 53 in step S17 (No), control then goes to step S18 in which the CPU 40 determines whether all the read line image data from the decoded data memory 52 has been processed. If all the read image data is not finished in step S18 (No), then control goes back to step S13.

If the variable I less than or equal to "0" in step S16 (No), then the read high-density line image data is converted to serial line image data by the P/S converter 28, and dot data are eliminated in the main scanning direction based on the size of the reduced image, by the gate array 31. Image data which has been reduced in size in the auxiliary and main scanning directions is supplied to the thermal head driver 30, from which it is supplied as recording line image data to the thermal head 22 in step S19.

The CPU 40 outputs first and second strobe signals SS1, SS2 to the thermal head driver 30, which energizes the thermal head 22 to record the reduced image data on the recording sheet P in step S20. Then, the CPU 40 sets the variable I to I+b, in step S21. The CPU 40 outputs a predetermined number of drive pulses to the sheet feed motor 37 to feed the recording sheet P by a superfine pitch in step S22. Then, control goes from step S22 to step S17.

If all the read image data from the decoded data memory 52 has been processed, Yes in step S18, then the CPU 40 leaves the control process shown in FIG. 4 and returns to a main control routine for controlling the facsimile apparatus 1.

The above control operation will be illustrated for the case that an original size image is to be copied on the recording sheet P.

Since the image is not reduced, variable "a" is set to "1" and variable "b" is also set to "1". As shown in FIG. 6, "A line image data" read in a first period of 5 msec. is converted to "A1 line image data" (A1) and "A2 line image data" (A2) for high-density recording. The left-hand half of the "A1 line image data" (A1) is recorded on the recording sheet P in response to a first strobe signal SS1a, and the right-hand half of the "A1 line image data" (A1) is recorded on the recording sheet P in response to a second strobe signal SS2a. Thereafter, a drive pulse P1 during a time period "t" (which may be of 2.5 msec.), is output from the motor driver 36 to the sheet feed motor 37, which feeds the recording sheet P by a superfine pitch of about 65 μm. Then, the left-hand half of the "A2 line image data" (A2) is recorded on the recording sheet P in response to a first strobe signal SS1b, and the right-hand half of the "A2 line image data" (A2) is recorded on the recording sheet P in response to a second strobe signal SS2b. Thereafter, a drive pulse P2 during a time period "t" is output from the motor driver 36 to the sheet feed motor 37, which feeds the recording sheet P by another superfine pitch.

Subsequently, "B line image data", "C line image data", "D line image data", and "E line image data" read in successive periods of 5 msec. are similarly converted to "B1 line image data" (B1) and "B2 line image data" (B2), "C1 line image data" (C1) and "C2 line image data" (C2), "D1 line image data" (D1) and "D2 line image data" (D2), and "E1 line image data" (E1) and "E2 line image data" (E2), respectively, for high-density recording. Left-hand halves of these line image data are successively recorded in response to respective first strobe signals SS1c through SS1i, and right-hand halves of these line image data are successively recorded in response to respective second strobe signals SS2c through SS2i. After each line image data has been recorded, one of drive pulses P3 through P9 is supplied from the motor driver 36 to the sheet feed motor 37, which feeds the recording sheet P by a superfine pitch.

Figure 8:
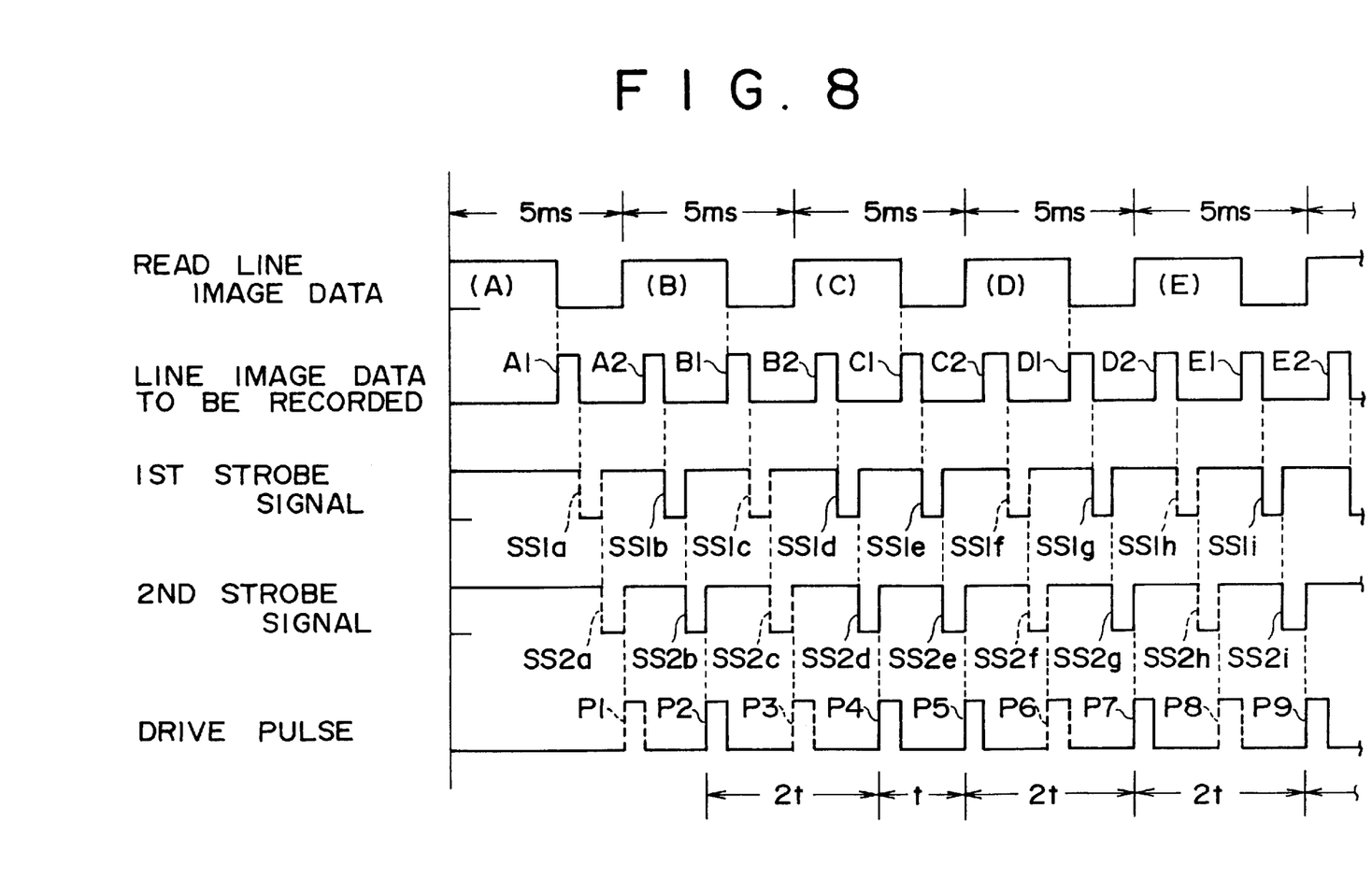
FIG. 8 is a timing chart of various signals produced in the facsimile apparatus when image data is recorded at 60% of its original size.

When the image is to be reduced to 60% of its original size, the variable "a" is set to "3" and the variable "b" set to "5" in step S12 (see FIG. 4). The high-density image data (i.e., line A1) stored in the first recording data memory 53 in step S13 is read successively from the first line of data in step S14. Then, the variable I is set to (5−3)=2 in the step S15. Since the variable I is greater than 0, (step S16: Yes), the next high-density line data (i.e., line A2) is searched for in the step S17, thus skipping the "A1 line image data". Therefore, a drive pulse P1 shown in FIG. 8 is not outputted to the sheet feed motor 37.

Figure 9:
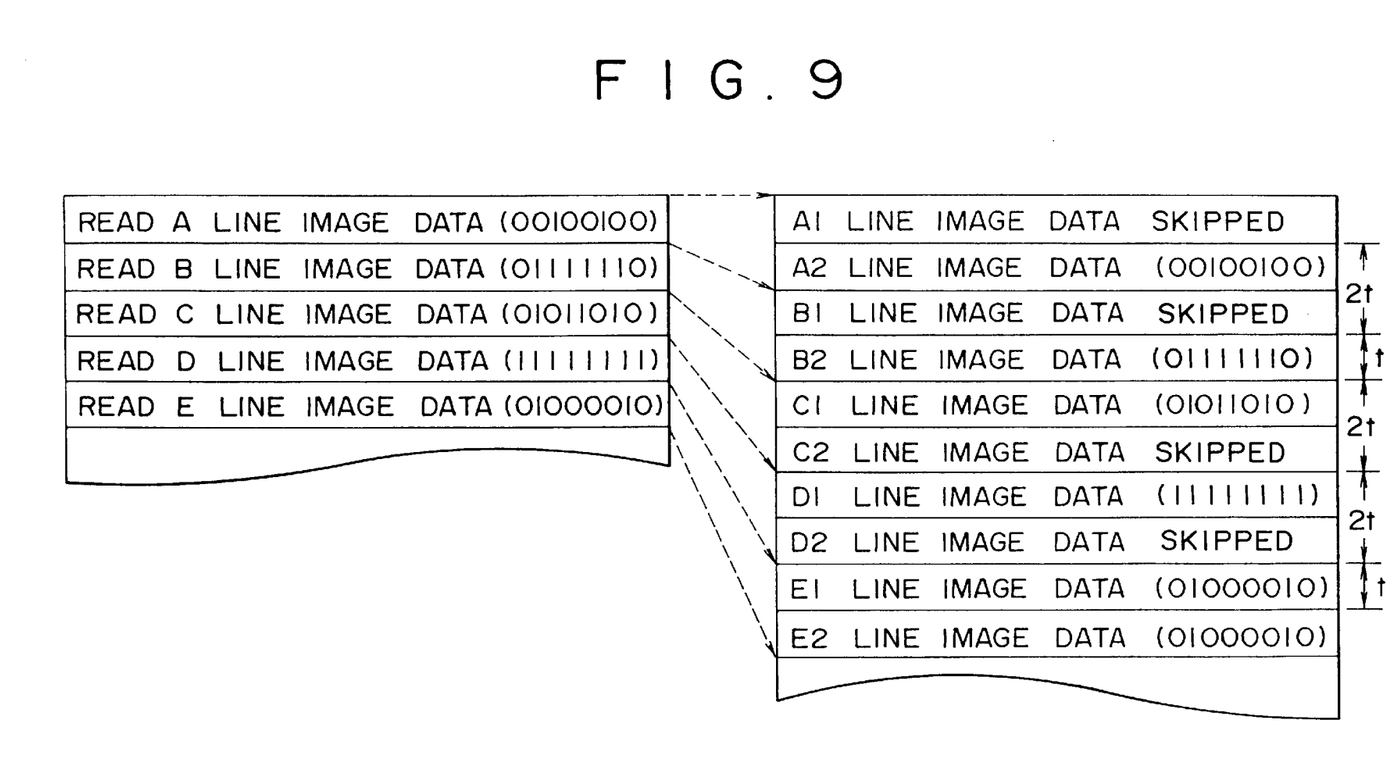
FIG. 9 is a diagram which shows image data read in a fine mode that is recorded on the facsimile of FIG. 1, when the image is to be reduced to 60% of its original size.

Then, the variable I is set to (2−3)=−1 in step S15. Since the variable I is less than 0, the next "A2 line image data" is recorded on the recording sheet P in the steps S19, S20. Thereafter, the variable I is set to (−1+5)=4 in the step S21, and a drive pulse P2 shown in FIG. 8 is outputted to the sheet feed motor 37 to feed the recording sheet P by a superfine pitch in the step S22. Subsequently, the "B1 line image data", the "C2 line image data", the "D2 line image data", etc. are skipped (i.e., not recorded on the recording sheet P). When these line image data are skipped, the sheet feed motor 37 is not supplied with strobe signals SS1c, SS2c and drive pulse P3 which correspond to the skipped "B1 line image data" (B1), strobe signals SS1f, SS2f and drive pulse P6 which correspond to the skipped "C2 line image data" (C2), strobe signals SS1h, SS2h and a drive pulse P8 which corresponds to the skipped "D2 line image data" (D2). Therefore, an image reduced in size with the above line data skipped, is recorded on the recording sheet P. As shown in FIGS. 8 and 9, when the high-density line data are skipped, the sheet feed motor 37 is energized at an interval "2t", which is twice the time "t".

As described above, line image data that has been read by the reading sensor 10 is converted to high-density line image data having a high resolution, and when the image is to be reduced, the thermal head 22 and the sheet feed motor 37 are repeatedly switched into and out of operation to periodically skip certain lines of the high-density line image data based on the size of the reduced image. Thus, the sheet feed motor 37 is energized at the shorter interval "t" when each superfine line image data is being recorded on the recording sheet P, and energized at the interval "2t", which is only twice the interval "t", when line data is skipped. Consequently, the sheet feed motor 37 is not energized at intervals of time which differ by a large time period, thereby enabling the recording sheet P to be fed smoothly. The sheet feed motor 37 is prevented from stepping out of control, so that images recorded on the recording sheet P have a high quality.

When the facsimile apparatus is reducing an image that has been transmitted from another facsimile apparatus, a similar process to that shown in FIG. 4 is employed, except that the data as shown in FIG. 9 is stored in the memory 54 and then the data is recorded on the recording sheet P.

The above control process for reducing and recording image data is also applicable when image data read by the reading sensor 10 at the resolutions of the standard and superfine modes are to be reduced in size and recorded on a recording sheet P. Furthermore, the control process may also be employed to reduce in size any image data which has been received from an external source in either the standard, fine, or superfine mode.

The processing and timing diagrams for an image reduced to 60% of its original size were illustrated, however, the present invention is applicable for images reduced to any size. The principles of the present invention are applicable to any other image processing apparatus such as a facsimile apparatus, copying apparatus, or the like equipped with various image recorders such as thermosensitive image recorders, electrophotographic image recorders, or the like.

What is claimed is:

1. An image processing apparatus comprising:
   means for reading lines of image data having a first resolution and corresponding to an image of a first size;
   means for converting each of said lines of image data having said first resolution to lines of high density image data having a second resolution, said second resolution being higher than said first resolution, a number of lines of said high density image data being greater than a number of lines of said image data having said first resolution;
   recording means for recording said lines of said high density image data on a recording sheet synchronously with said reading means reading said line of said image data to produce an image of a predetermined size, said predetermined size being reduced from said first size;

sheet feeding means for feeding said recording sheet by a predetermined amount when a line of said high density image data is recorded on said recording sheet, said predetermined amount corresponding to said second resolution;

setting means for setting a size that said image is to be reduced to and recorded on said recording sheet;

determining means for determining lines of said high density image data not to be recorded by said recording means, in response to said size set by said setting means; and control means for controlling said recording means to skip said determined lines of said high density image data, and for inhibiting said sheet feeding means from feeding said recording sheet when said recording means is controlled to skip said determined lines of said high density image data.

2. The image processing apparatus according to claim 1, wherein said determining means converts said size into a fractional number A/B, wherein for each of said lines of said high density image data said determining means repeatedly and successively determines whether said line of said high density image data should be skipped, said determining means decreasing a variable I, which is initially set to B, by A, wherein when I is greater than 0, said determining means determines that said line should be skipped, and wherein when I is not greater than 0, said determining means further increases said variable I by B, and determines that said line should be recorded.

3. The image processing apparatus according to claim 1, wherein said reading means comprises a scanning device which scans an image of an original at said first resolution.

4. The image processing apparatus according to claim 1, wherein said reading means comprises a receiving device which receives lines of image data transmitted from an external source, said lines of image data having said first resolution.

5. The image processing apparatus according to claim 1, wherein said first and second resolutions are resolutions in a direction perpendicular to a direction along which each of said lines of image data recorded on said recording sheet extends.

6. The image processing apparatus according to claim 5, wherein said feeding means feeds said recording sheet in said direction perpendicular to a direction along which each of said lines of image data recorded on said recording sheet extends.

7. The image processing apparatus according to claim 6, wherein said high density image data having said second resolution has twice as many number of lines as said image data having said first resolution.

8. The image processing apparatus according to claim 1, wherein at least one line of said high density image data corresponding to each line of said image data having said first resolution is recorded, if a size set by said setting means requires that a number of lines of said high density image data to be recorded is not less than a half of a total number of lines of said high density image data.

9. The image processing apparatus according to claim 8, wherein said recording means periodically records said line of said high density image data and said feeding means periodically feeds said recording sheet by said predetermined amount.

10. An image processing apparatus comprising:

a scanning device that scans lines of image data having a first resolution and corresponding to an image of a first size;

a data converter that converts each of said lines of image data having said first resolution to lines of high density image data having said second resolution, a number of lines of said high density image data being greater than a number of lines of said image data having said first resolution;

a printer that prints image data having said second resolution on a recording sheet synchronously with said scanning device scanning said lines of said image data to produce an image of a predetermined size, said predetermined size being reduced form said first size, said second resolution being higher than said first resolution, lines printed on said recording sheet by said printer having said second resolution;

a sheet feeding device that feeds a recording sheet by a predetermined amount when a line of said high density image data is printed on said recording sheet, said predetermined amount corresponding to said second resolution;

a setting device that sets a size that said image is to be reduced to and printed on said recording sheet; and a controller that determines whether a line of said high density image data is to be printed in accordance with said size set by said setting device;

wherein said controller inhibits said printer from printing a line which is determined not to be printed, and inhibits said sheet feeding device from feeding said recording sheet when said printer is inhibited from printing said line of said high density image data.

11. The image processing apparatus according to claim 10, wherein said high density image data having said second resolution has twice as many number of lines as said image data having said first resolution.

12. The image processing apparatus according to claim 10, wherein at least one line of said high density image data corresponding to each line of said image data having said first resolution is printed, if a size set by said setting device requires that a number of lines of said high density image data to be printed is not less than a half of a total number of lines of said high density image data.

13. The image processing apparatus according to claim 12, wherein said printer periodically prints said line of said high density image data and said sheet feeding device periodically feeds said recording sheet by said predetermined amount.

14. The image processing apparatus according to claim 10, wherein said size is converted into a fractional number A/B, and a determination is made repeatedly and successively for said lines of said high density image data with use of a variable I which is initially set to B, determination being made such that I is decreased by A, and (i) if I is greater than 0, then printing of a line is skipped, while (ii) if I is not greater than 0, then I is incremented by B, and the line is printed.

15. An image processing apparatus for printing a reduced image of an original on a recording sheet, said image processing apparatus comprising:

means for setting a reduction amount;

means for reading said original image at a first line resolution to obtain an original image data;

means for converting said original image data into a converted image data that represents said original image at a second line resolution which is greater than said first line resolution;

means for determining line image data elements of said converted image data to be printed, said determination being based on said reduction amount setting, said individual line data elements determined to be printed being distributed substantially evenly among all line data elements of said converted data;

means for forming said reduced image by printing said line data element on said recording sheet at said second resolution.

16. The image processing apparatus according to claim 15, wherein said forming means further comprises a printing means which prints said line data elements determined to be printed if it is determined to be printed by said determining means, printing being prohibited for line data elements which have been determined not to be printed; and means for feeding said recording sheet by an amount corresponding to said second line resolution only when a line data is printed by said printing means.

* * * * *